(12) United States Patent
Hwang et al.

(10) Patent No.: US 10,587,336 B2
(45) Date of Patent: Mar. 10, 2020

(54) METHOD AND USER DEVICE FOR TRANSCEIVING DATA IN NEXT GENERATION MOBILE COMMUNICATION SYSTEM

(71) Applicant: LG ELECTRONICS INC., Seoul (KR)

(72) Inventors: Jinyup Hwang, Seoul (KR); Inkwon Seo, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 15/517,483

(22) PCT Filed: Nov. 3, 2015

(86) PCT No.: PCT/KR2015/011701
§ 371 (c)(1),
(2) Date: Apr. 6, 2017

(87) PCT Pub. No.: WO2016/072700
PCT Pub. Date: May 12, 2016

(65) Prior Publication Data
US 2017/0310385 A1    Oct. 26, 2017

Related U.S. Application Data

(60) Provisional application No. 62/075,274, filed on Nov. 5, 2014.

(51) Int. Cl.
*H04B 7/26* (2006.01)
*H04W 72/04* (2009.01)

(52) U.S. Cl.
CPC ............ *H04B 7/26* (2013.01); *H04W 72/042* (2013.01); *H04W 72/0413* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,803,635 B1 * | 8/2014 | Ashworth | H01P 1/213 333/126 |
| 2011/0034177 A1 * | 2/2011 | Oh | H04J 11/0086 455/450 |

(Continued)

OTHER PUBLICATIONS

Samsung, "Introduction of Dual Connectivity," 3GPP TSG-RAN2 Meeting #87bis, R2-144664, Oct. 2014, 84 pages.
(Continued)

*Primary Examiner* — Mamadou L Diallo
(74) *Attorney, Agent, or Firm* — Lee Hong Degerman Kang Waimey

(57) ABSTRACT

A disclosure of the present specification provides a method for transceiving data in a next generation mobile communication system. The method may comprise a step of receiving system information from a base station. The system information may comprise: system band information; information regarding a first uplink center frequency and a second uplink center frequency for an uplink band within the system band; and information regarding a first downlink center frequency and a second downlink center frequency for a downlink band within the system band. The method may comprise: a step of receiving, from the base station, a control signal to change the downlink band to a second downlink center frequency; and a step of tuning a radio frequency (RF) unit in order to switch the downlink band from the first downlink center frequency to the second downlink center frequency.

9 Claims, 12 Drawing Sheets

(52) U.S. Cl.
CPC ....... *H04W 72/0453* (2013.01); *H04B 7/2612* (2013.01); *H04W 72/0486* (2013.01)

(56) References Cited

U.S. PATENT DOCUMENTS

| | | | |
|---|---|---|---|
| 2012/0063373 A1 | 3/2012 | Chincholi et al. | |
| 2012/0236783 A1* | 9/2012 | Park | H04L 5/001 370/315 |
| 2012/0263130 A1* | 10/2012 | Ishikura | H04L 5/001 370/329 |
| 2013/0336156 A1 | 12/2013 | Wei et al. | |
| 2014/0029491 A1* | 1/2014 | Lo | H04W 16/14 370/281 |
| 2014/0071862 A1* | 3/2014 | Ji | H04L 5/0037 370/280 |
| 2014/0211742 A1* | 7/2014 | Kim | H04L 5/003 370/329 |
| 2014/0274193 A1* | 9/2014 | Ashworth | H04W 52/52 455/522 |
| 2015/0139048 A1* | 5/2015 | Lou | H04L 5/14 370/280 |
| 2017/0347350 A1* | 11/2017 | Takeda | H04W 72/04 |

OTHER PUBLICATIONS

Huawei, "Motivation of Rel-13 New Study Item proposal Evolving LTE with Flexible Duplex for Traffic Adaptation," 3GPP TSG-RAN Meeting #65, RP-141300, Sep. 2014, 5 pages.
PCT International Application No. PCT/KR2015/011701, Written Opinion of the International Searching Authority dated Mar. 31, 2016, 6 pages.

\* cited by examiner

METHOD AND USER DEVICE FOR TRANSCEIVING DATA IN NEXT GENERATION MOBILE COMMUNICATION SYSTEM

CROSS-REFERENCE TO RELATED APPLICATIONS

This application is the National Stage filing under 35 U.S.C. 371 of International Application No. PCT/KR2015/011701, filed on Nov. 3, 2015, which claims the benefit of U.S. Provisional Application No. 62/075,274, filed on Nov. 5, 2014, the contents of which are all hereby incorporated by reference herein in its entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

Meanwhile, in order to accommodate gradually increasing data traffic, in a next-generation mobile communication system, popularly known as 5-generation mobile communication system, it is expected that a wideband frequency band is to be used in high frequency waves. However, in such a wide frequency band, the existing duplex schemes such as FDD and TDD are not efficient.

Further, when a full duplex scheme based on FDD is used in a wide frequency band, an eNB or a UE experience the self-interference problem in a wider band.

SUMMARY OF THE INVENTION

Accordingly, a disclosure of the present specification has been made in an effort to solve the aforementioned problem.

In order to achieve the above-described object, a disclosure of the present specification presents a dynamic division duplex (DDD) as a new duplex scheme.

In an aspect, a method of transmitting/receiving data in a next-generation mobile communication system is provided. The method includes receiving system information from a base station wherein the system information includes information on a system band, information on a first uplink central frequency and a second uplink central frequency for a uplink band in the system band, and information a first downlink central frequency and a second downlink central frequency for a downlink band in the system band, receiving, from the base station, a control signal directing the downlink band to the second downlink central frequency, tuning a RF (radio frequency) unit in order to switch the downlink band from the first downlink central frequency to the second downlink central frequency, and receiving, from the base station, downlink data on the downlink band according to the second downlink central frequency.

The system band may be divided into a uplink-dedicated band, a upward/downward variable band, and a downlink-dedicated band.

The downlink central frequency may correspond to a central frequency of the downlink-dedicated band and the second downlink central frequency may correspond to a central frequency of a band which is generated by combining the downlink-dedicated band with the upward/downward variable band.

The first uplink central frequency may correspond to a central frequency of the uplink-dedicated band and the second uplink central frequency may correspond to a central frequency of a band which is generated by combining the uplink-dedicated band with the upward/downward variable band.

The method may further include receiving, from the base station, downlink data on a downlink band according to the first downlink central frequency until receiving a control signal directing a change to the second downlink central frequency.

The method may further include transmitting, to the base station, uplink data on a uplink band according to the first uplink central frequency.

The method may further include receiving, from the base station, a control signal directing a change of the uplink band to the second uplink central frequency and turning the RF unit in order to switch the uplink band from the first uplink central frequency to the second uplink central frequency.

In another aspect, a user device for receiving data in a next-generation mobile communication system is provided. The user device includes a RF (radio frequency) unit and a processor for controlling the RF unit, in which the processor receives system information from a base station wherein the system information includes information on a system band, information on a first uplink central frequency and a second uplink central frequency for a uplink band in the system band, and information a first downlink central frequency and a second downlink central frequency for a downlink band in the system band, receives, from the base station, a control signal directing the downlink band to the second downlink central frequency, tunes a RF (radio frequency) unit in order to switch the downlink band from the first downlink central frequency to the second downlink central frequency, and receives, from the base station, downlink data on the downlink band according to the second downlink central frequency.

When a dynamic division duplex (DDD) scheme according to the disclosure of the present specification is used, resource may be efficiently used by freely using a second area (i.e., a central area) as uplink or downlink in one frequency broadband. Further, the first area is always used as uplink in one frequency broadband, and thus the problem that HARQ procedure has become complicated in the existing TDD may be resolved.

DESCRIPTION OF EXEMPLARY EMBODIMENTS

Figure 1:
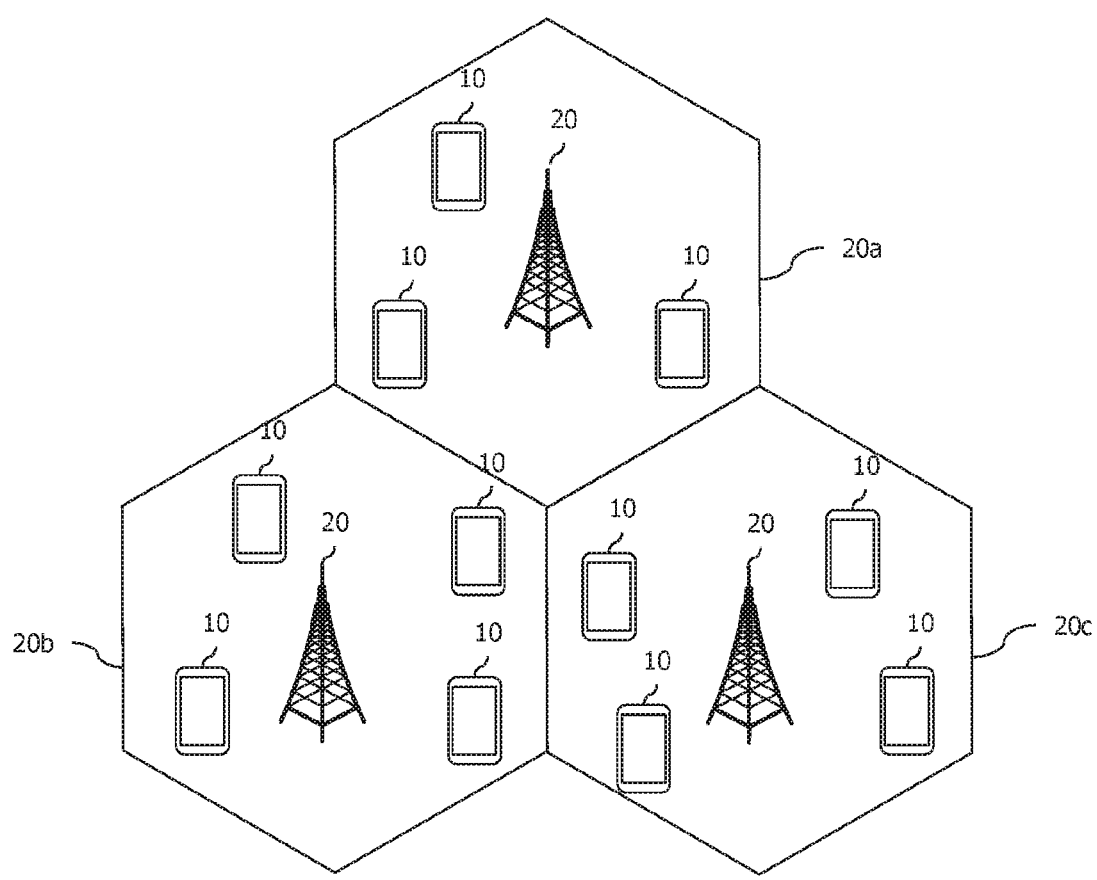
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS(mobile station), UT(user terminal), SS(subscriber station), MT(mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
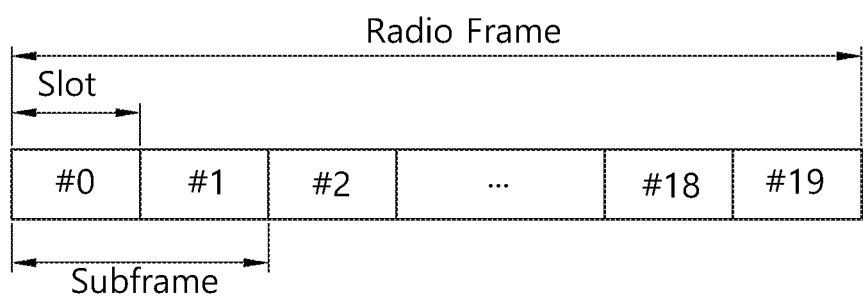
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
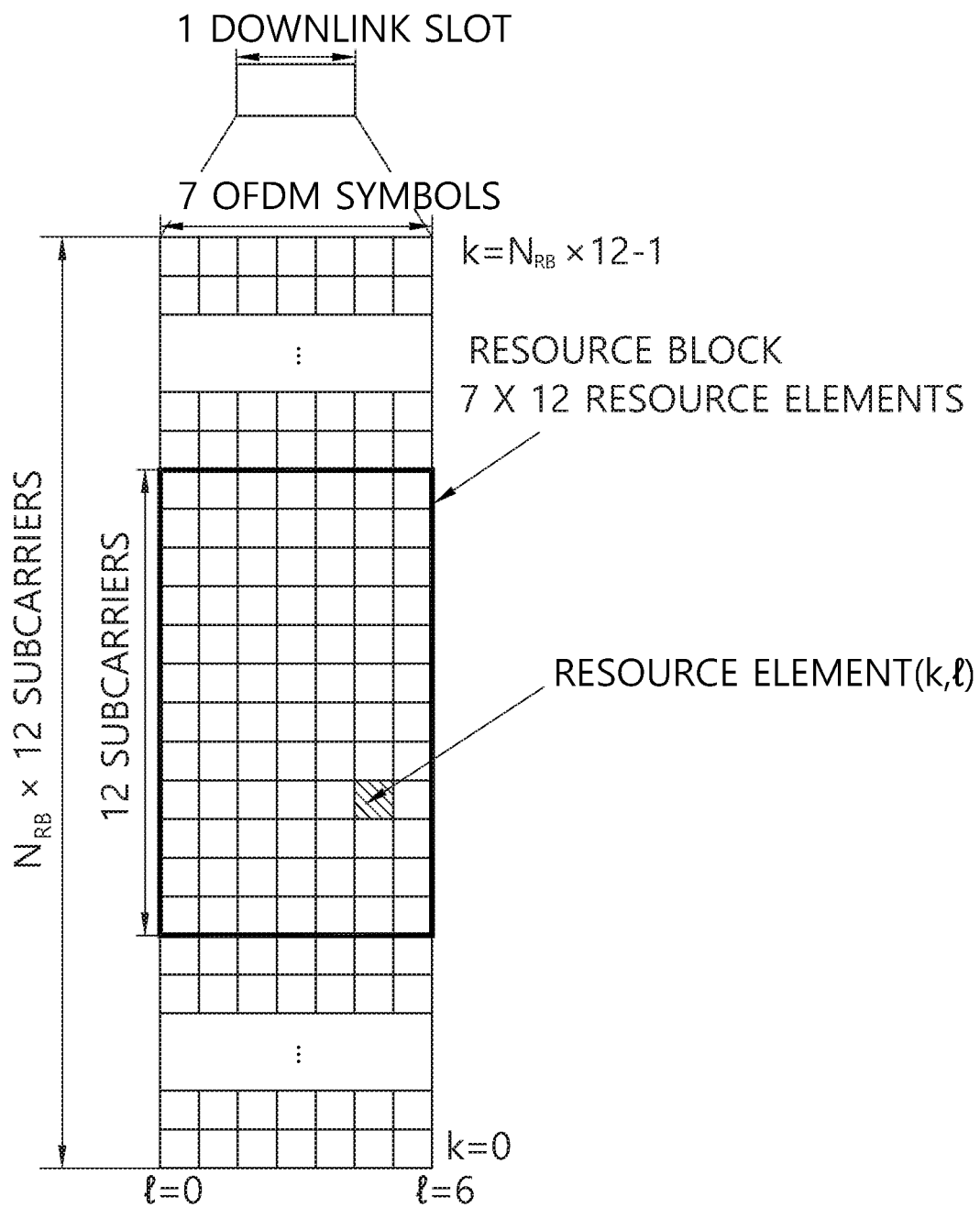
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
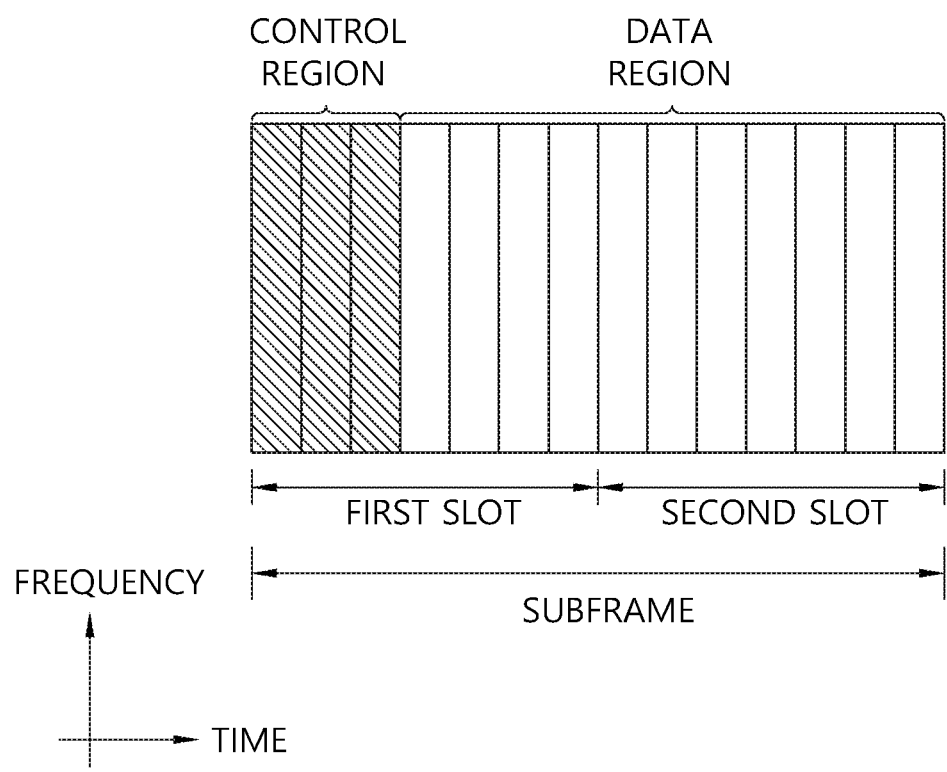
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
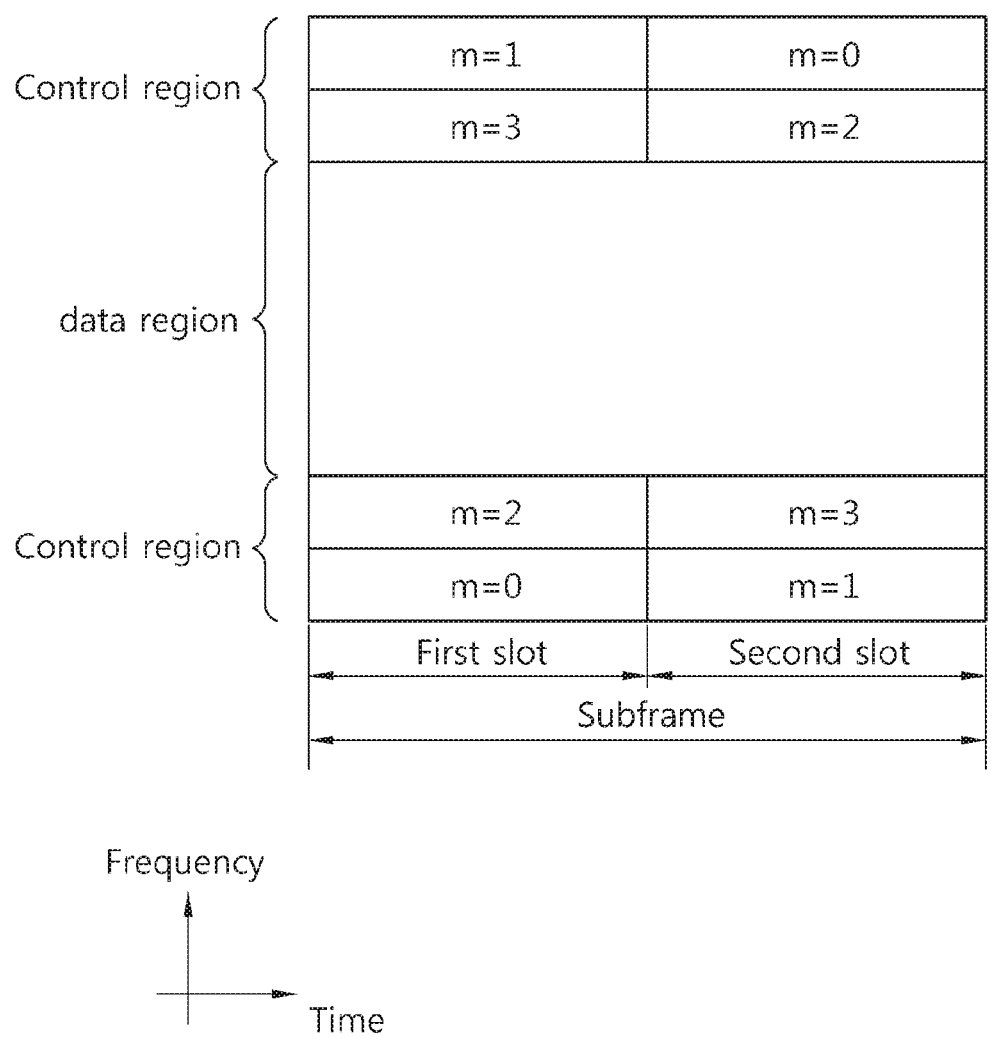
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

<Introduction of Small Cell in a Potential Next-generation Wireless Communication System>

It is expected that small cells with small cell coverage are added to the coverage of an existing cell in a next-generation mobile communication system and deal with greater traffic. The existing cell has relatively larger coverage than the small cells and thus is referred to as a macrocell, which is described with reference to FIG. 6.

Figure 6:
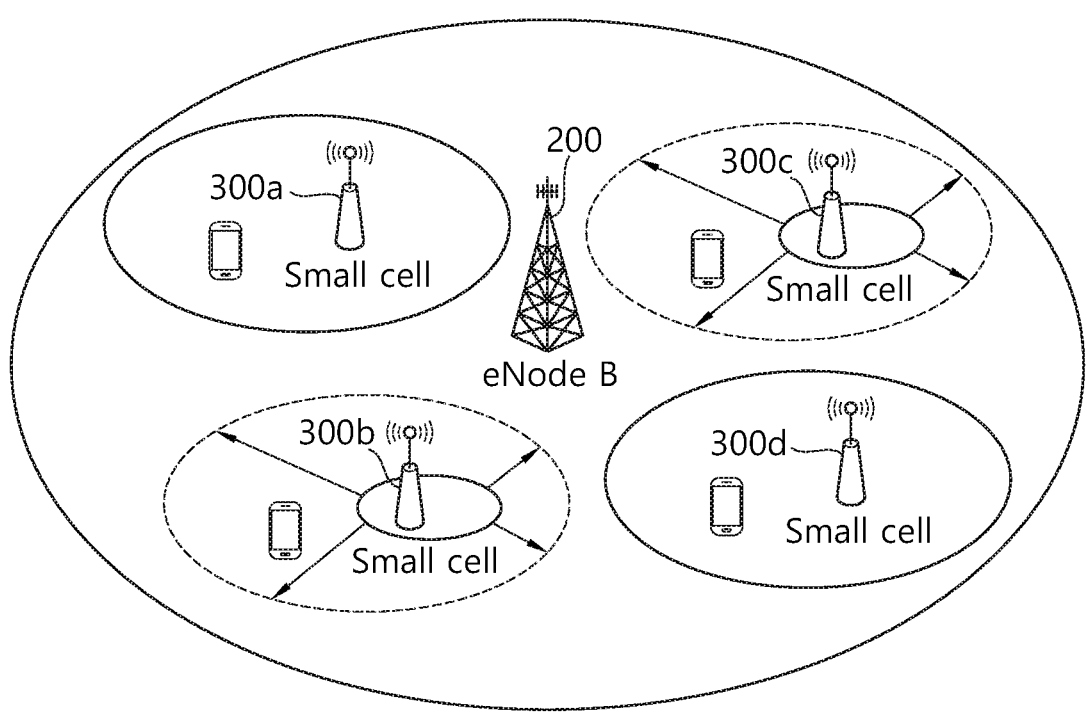
FIG. 6 illustrates an environment of a heterogeneous network including a macrocell and small cells as a potential next-generation wireless communication system.

FIG. 6 illustrates an environment of a heterogeneous network including a macrocell and small cells as a potential next-generation wireless communication system.

FIG. 6 shows a heterogeneous network environment in which a macrocell based on an existing BS 200 overlaps with small cells based on one or more small BSs 300a, 300b, 300c, and 300d. The existing BS provides relatively larger coverage than the small BSs and thus is also referred to as a macro BS (macro eNodeB: MeNB). In the present specification, a macrocell may be replaceable with a macro BS. A UE connected to the macrocell 200 may be referred to as a macro UE. The macro UE receives a downlink signal from the macro BS and transmits an uplink signal to the macro BS.

In this heterogeneous network, the macrocell is set as a primary cell (Pcell) and the small cells are set as secondary cells (Scell), thereby filling a gap in the macrocell coverage. Further, the small cells are set as primary cells (Pcell) and the macrocell is set as a secondary cell (Scell), thereby boosting overall performance.

<LTE-U (LTE-Unlicensed Spectrum) for Next Generation Mobile Communication System>

Recently, as more and more communication devices require a greater communication capacity, in the next generation wireless communication system, the efficient utilization of the limited frequency band is becoming a more and more important requirement. In the cellular communication such as LTE system, the method of utilizing an unlicensed band such as 2.4 GHz or an unlicensed band such as 5 GHz band which is used by the existing WLAN system is utilized in the traffic offloading is currently under consideration, which is called LTE-U.

Figure 7:
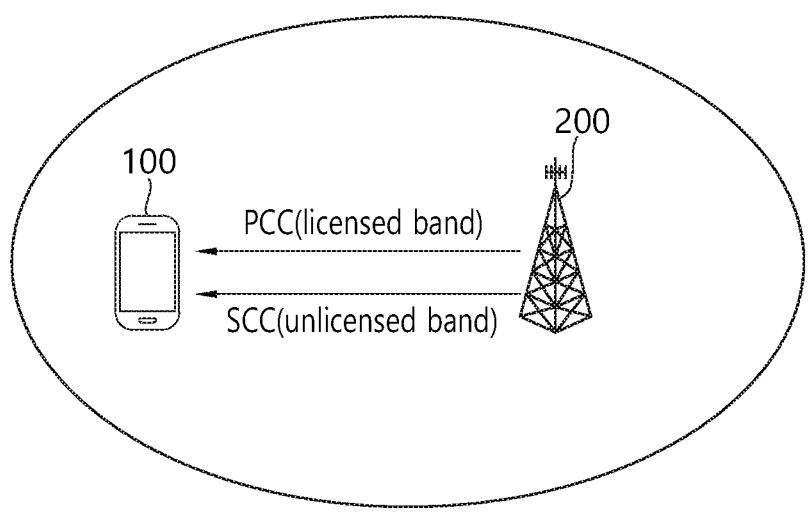
FIG. 7 illustrates an example of using a non-licensed band as carrier aggregation (CA).

FIG. 7 illustrates an example of using a non-licensed band as carrier aggregation (CA).

In order to transmit and receive a signal through a carrier wave of an unlicensed band in which the exclusive use of a certain system is not guaranteed, as illustrated in FIG. 7, the eNB 200 may transmit the signal to the UE 100 or the UE may transmit the signal to the eNB using the carrier aggregation (CA) of the unlicensed band and the LTE-A band which is the licensed band. Here, for example, the carrier wave of the licensed band may be understood as the primary CC (may be called "PCC" or "PCell"), and the carrier wave of the non-licensed band may be understood as the secondary CC (may be called "SCC" or "SCell"). However, the schemes proposed in the present specification may be applied in the situation that a multiple of licensed bands and unlicensed bands are used as the carrier aggregation scheme in an extended manner may be applied in the case that the signal transmission/reception is performed between the eNB and the UE. Further, the proposed schemes of the present invention may be applied in the system of other characteristics as well as the 3GPP LTE system in an extended manner.

<Broadband Frequency for the Next-generation Mobile Communication System>

As described above, in order to accommodate more and more increasing data traffic, the introduction of a small scale cell and the introduction of a new frequency band (i.e., unlicensed band) are currently discussed.

Further, in order to accommodate gradually increasing data traffic, in the next-generation mobile communication system, popularly known as 5G mobile communication system, it is expected that a wider frequency band in a higher frequency is to be used. However, it is a problem that in such a wide frequency band, FDD (frequency division duplexing) and TDD (frequency division duplexing) which are the existing duplex schemes are not efficient.

Further, when a full duplex scheme is used based on DFF in a wide frequency band, the eNB or the UE go through the self-interference problem in a wider band.

<Disclosure of the Present Specification>

Hence, the present specification proposes a new duplex scheme for a next-generation mobile communication expected to use a wider frequency band in a wider frequency in order to enhance the data transmission speed in the future. Namely, the disclosure of the present specification proposes a new duplex scheme and the structure of the frequency-time resource for the new duplex scheme.

Figure 8:
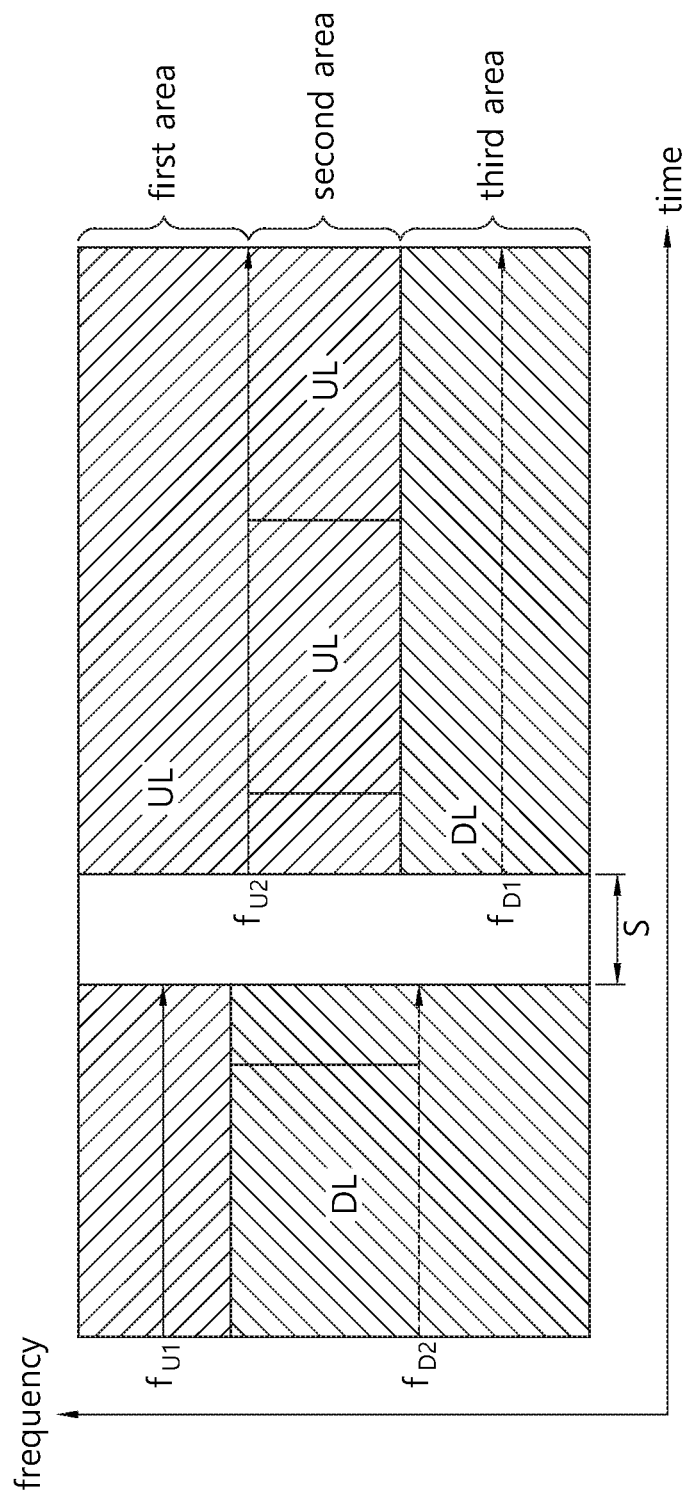
FIG. 8 illustrates the structure of a frequency-time resource for a new duplex scheme according to the disclosure of the present invention.

FIG. 8 illustrates the structure of a frequency-time resource for a new duplex scheme according to the disclosure of the present invention.

Referring to FIG. 8, the frequency broadband allocated to the UE is divided into 3 areas on the basis of the frequency. Both end areas are respectively used for the downlink and the uplink like FDD scheme. Namely, the first area is the uplink-dedicated band, and the third area is the downlink-dedicated band. Further, the second area (i.e., middle area) is used as the downlink or uplink depending on time as in TDD scheme. Such a second area may be called upward/downward variable band. Hence, the eNB may allocate the second area to the downlink or uplink in consideration of the amount of the network traffic. For example, when the downlink traffic is large, the eNB combines the third area and the second area and allocates the combined area to one downlink band, thereby enabling more downlink data to be transmitted. On the contrary, when the uplink traffic is large, the eNB combines the first area and the second area and allocates the combined area to the uplink band, thereby enabling the UE to transmit more uplink data.

Such a duplex scheme proposed in the present specification is called DDD (dynamic division duplex).

Likewise, It is not that the UE solely uses the second area (namely, the UE does not tune the RF unit of the UE according to the central frequency of the second area), but it is that the UE combines the second area with the first area and uses the combined area depending on the amount of uplink/downlink data traffic (namely, the UE tunes the RF unit of the UE according to the central frequency of the first area and the second area) or combines the second area with the third area and uses the combined area (namely, the UE tunes the RF unit of the UE according to the central frequency of the second area and the third area).

Likewise, in order to use the second area as downlink or uplink, the eNB and the UE respectively set the central frequency for the downlink and the central frequency for the uplink and switch the RF unit to one central frequency depending on the data traffic.

(1) Uplink

The UE and the eNB set information on two central frequencies (i.e., $f_{U1}$ and $f_{U2}$).

If only the second area is used, the UE changes the RF unit of the UE to central frequency $f_{U1}$ and transmits uplink data. Likewise, the eNB changes the RF unit of the eNB to central frequency $f_{U1}$ then receives uplink data from the UE.

Meanwhile, when more resources are needed with the increase of the uplink traffic, the eNB transmits the control signal for combing the first area with the second area and setting the combined area as one band to the UE. Namely, the eNB transmits, to the UE, the direction to change the central frequency from $f_{U1}$ to $f_{U2}$ and information that the channel bandwidth is changed. At this time, in order to for the UE to change the central frequency from $f_{U1}$ to $f_{U2}$, special time (S) is designated as illustrated, and the eNB stops transmission/reception of data for the special time period. Here, the special time may be defined as n symbol sections. Then the UE changes the RF unit of the UE to central frequency $f_{U2}$ then transmits uplink data. Likewise, the eNB changes the RF unit of the eNB to central frequency $f_{U2}$ then receives uplink data from the UE.

(2) Downlink Data

The UE and the eNB set information on two central frequencies (i.e., $f_{D1}$ and $f_{D2}$) for the downlink.

If only the third area is used, the eNB changes the RF unit of the eNB to central frequency $f_{D1}$ then transmits downlink data. Likewise, the UE changes the RF unit of the UE to central frequency $f_{D1}$ then receives downlink data from the eNB.

On the other hand, when more resources are needed with the increase of the downlink traffic, the eNB transmits, to the UE, the control signal directing to combine the second area with the third area and set the combined area as one band. Namely, the eNB transmits, to the UE, the direction to change the central frequency from $f_{D1}$ to $f_{D2}$ and information that the channel bandwidth is changed. At this time, in order for the UE to change the central frequency from $f_{D1}$ to $f_{D2}$, special time (S) is designated as illustrated, and the eNB stops transmission/reception of data for the special time.

Here, the special time may be defined as n symbol sections. Then the eNB changes the RF unit of the eNB to the central frequency $f_{D2}$ then transmits the downlink data to the UE. Likewise, the UE changes the RF unit of the UE to central frequency $f_{D2}$ then receives downlink data.

Figure 9:
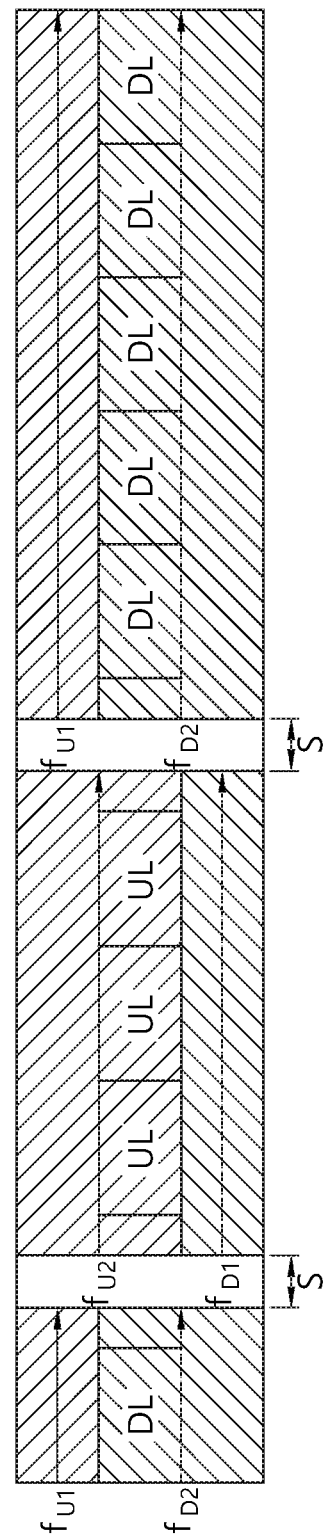
FIG. 9 illustrates special time sections given in the structure of a frequency-time resource presented in the present specification.

FIG. 9 illustrates special time sections given in the structure of a frequency-time resource presented in the present specification.

Referring to FIG. 9, special time (S) sections may be given to change the central frequency from $f_{U2}$ to $f_{U1}$ but may also be given to change the central frequency from $f_{D2}$ to $f_{D1}$.

Figure 10:
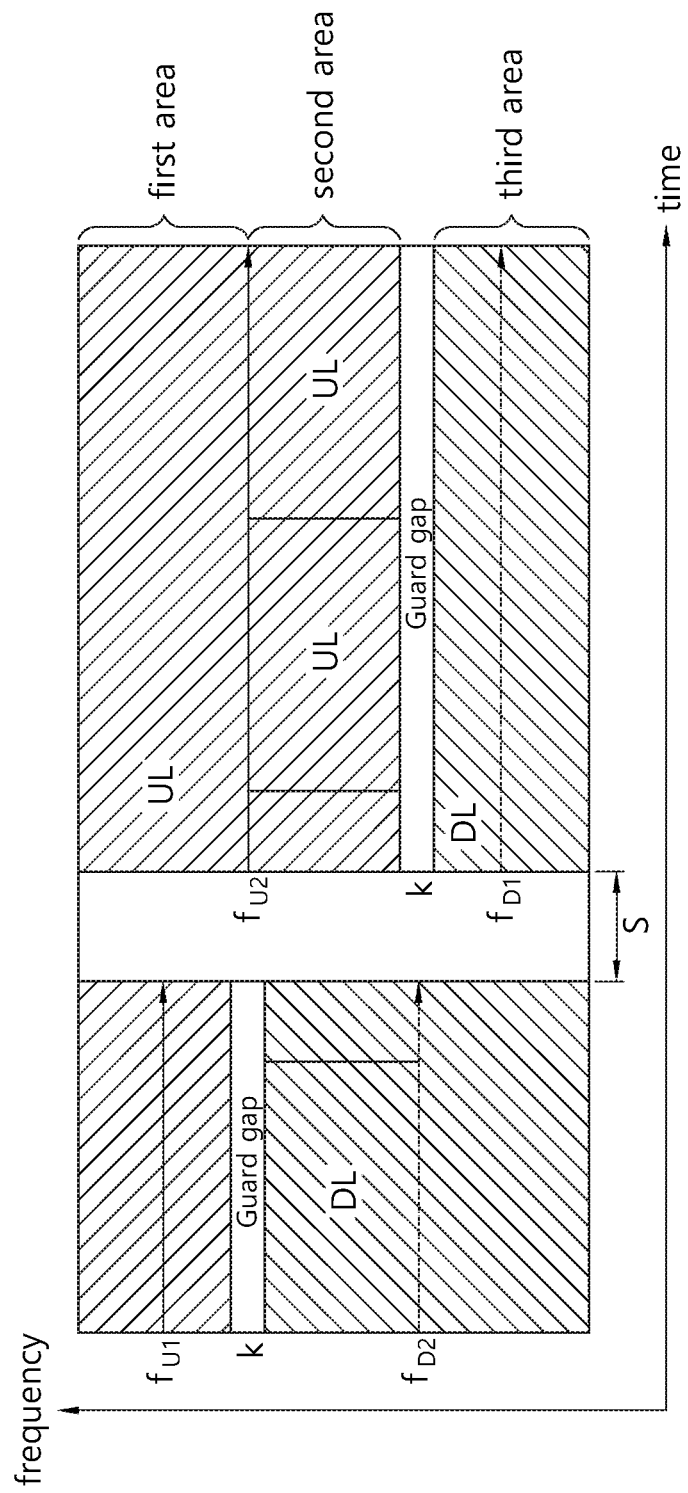
FIG. 10 illustrates a guard gap given in a structure of a frequency-time resource presented in the present specification.

FIG. 10 illustrates a guard gap given in a structure of a frequency-time resource presented in the present specification.

In the case of the DDD (dynamic division duplex) presented in the present specification, there is no self-interference unlike the full duplex scheme, but since the first area, the second area, and third area are attached to each other on the frequency axis, the downlink signal transmitted by the eNB is leaked to the uplink band which should be received by the eNB as the RF filter characteristic of the uplink and the downlink, and similarly the uplink signal transmitted by the UE is leaked to the downlink band which should be received by the UE.

According to a disclosure of the present specification, a guard gap may be designated between the uplink band and the downlink band in consideration of such a leakage. The guard gap may include k sub-carrier waves. Meanwhile, the size of the guard gap may be adjusted according to the MPR (maximum power reduction).

Figure 11:
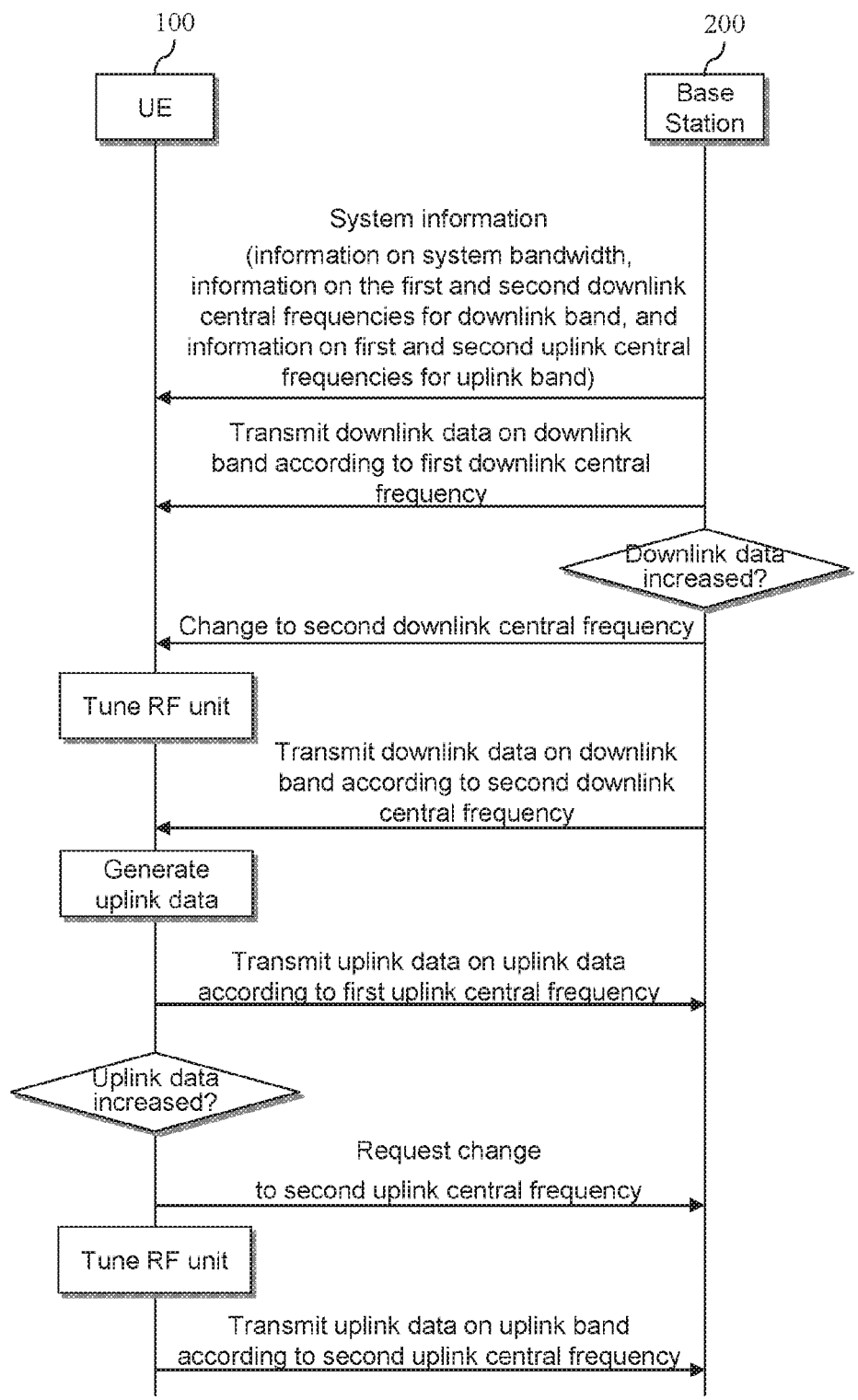
FIG. 11 is a flowchart illustrating a method of operating a user device in a structure of a frequency-time resource presented in the present specification.

FIG. 11 is a flowchart illustrating a method of operating a user device in a structure of a frequency-time resource presented in the present specification.

Referring to FIG. 11, a UE 100 may receive system information from a UE 200. The system information may include information on a system band. The system band may be divided into the uplink-dedicated band, the uplink/downlink variable band, and the downlink-dedicated band. The system information may further include information on the first uplink central frequency and the second uplink central frequency for the uplink band in the system band and information for the first downlink central frequency and the second downlink central frequency for the downlink band in the system band.

Here, the first downlink central frequency may correspond to the central frequency of the downlink-dedicated band. Further, the second downlink central frequency may correspond to the central frequency of the band which is generated by combining the downlink-dedicated band with the upward/downward variable band. Further, the first uplink central frequency may correspond to the central frequency of the uplink-dedicated band. Further, the second uplink central frequency may correspond to the central frequency of the band which is generated by combining the uplink-dedicated band with the upward/downward variable band.

Meanwhile, the UE 100 may receive downlink data from the eNB on the downlink band according to the first downlink central frequency.

Thereafter, if the UE 100 receives, from the eNB 200, a control signal which directs to change the downlink band to the second downlink central frequency, the UE 100 tunes the RF (radio frequency) unit in order to switch the downlink band from the first downlink central frequency to the second downlink central frequency.

Then downlink data may be received from the eNB on the downlink band according to the second downlink central frequency.

Meanwhile, if uplink data to be transmitted by the UE 100 is generated, the UE 100 may transmit uplink data to the eNB 200 on the uplink-dedicated band according to the first uplink central frequency.

Meanwhile, if the amount of the uplink data to be transmitted increases, the UE 100 transmits a request to change to the second uplink central frequency.

Thereafter, the UE 100 tunes the RF unit in order to switch from the first uplink central frequency to the second uplink central frequency. Thereafter, the UE may transmit uplink data to the eNB on the uplink band according to the second uplink central frequency.

The above-described embodiments of the present invention may be implemented by various means. For example, the embodiments of the present invention may be implemented by hardware, firmware, software, and a combination thereof, which will be described in detail with reference to the drawings.

Figure 12:
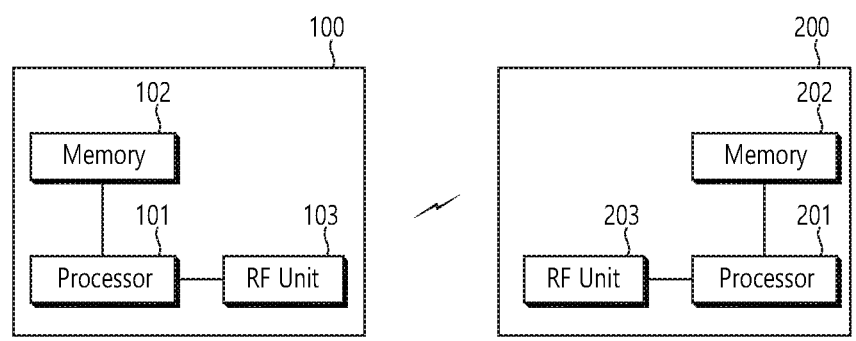
FIG. 12 is a block diagram illustrating a wireless communication system in which the disclosure of the present specification is implemented.

FIG. 12 is a block diagram illustrating a wireless communication system in which the disclosure of the present specification is implemented.

An eNB 200 includes a processor 201, a memory 202, and a RF unit 203. The memory 202 is connected to the processor 201 and stores various information for operating the processor 201. The RF unit 203 is connected to the processor 201 and transmits and/or receives a wireless signal. The processor 201 implements a proposed function, process and/or method. In the above-described embodiments, the operation of the eNB may be implemented by the processor 201.

A UE 100 includes a processor, a memory 102, and a RU unit 103. The memory 102 is connected to the processor 101 and stores various information for operating the processor 101. The RU unit 103 is connected to the processor 101 and transmits and/or receives a wireless signal. The processor 101 implements a proposed function, process and/or method.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting/receiving data in a next-generation mobile communication system, the method comprising:
    receiving system information from a base station,
    wherein the system information comprises information on a system band, information on a first uplink central frequency and a second uplink central frequency for a uplink band in the system band, and information on a first downlink central frequency and a second downlink central frequency for a downlink band in the system band, and
    wherein the system band is divided into an uplink-dedicated band, an upward/downward variable band, and a downlink-dedicated band;
    receiving, from the base station, a control signal directing the downlink band to the second downlink central frequency;
    tuning a RF (radio frequency) unit in order to switch the downlink band from the first downlink central frequency to the second downlink central frequency; and
    receiving, from the base station, downlink data on the downlink band according to the second downlink central frequency.

2. The method of claim 1, wherein the downlink central frequency corresponds to a central frequency of the downlink-dedicated band and wherein the second downlink central frequency corresponds to a central frequency of a band which is generated by combining the downlink-dedicated band with the upward/downward variable band.

3. The method of claim 1, wherein the first uplink central frequency corresponds to a central frequency of the uplink-dedicated band and wherein the second uplink central frequency corresponds to a central frequency of a band which is generated by combining the uplink-dedicated band with the upward/downward variable band.

4. The method of claim 1, further comprising:
    receiving, from the base station, downlink data on a downlink band according to the first downlink central frequency until receiving a control signal directing a change to the second downlink central frequency.

5. The method of claim 1, further comprising:
    transmitting, to the base station, uplink data on a uplink band according to the first uplink central frequency.

6. The method of claim 1, further comprising:
    receiving, from the base station, a control signal directing a change of the uplink band to the second uplink central frequency; and
    turning the RF unit in order to switch the uplink band from the first uplink central frequency to the second uplink central frequency.

7. A user device for receiving data in a next-generation mobile communication system, the user device comprising:
    a RF (radio frequency) unit; and
    a processor for controlling the RF unit,
    wherein the processor is configured to:
    receive system information from a base station,
        wherein the system information comprises information on a system band, information on a first uplink central frequency and a second uplink central frequency for a uplink band in the system band, and information on a first downlink central frequency and a second downlink central frequency for a downlink band in the system band, and
        wherein the system band is divided into an uplink-dedicated band, an upward/downward variable band, and a downlink-dedicated band;
        receive, from the base station, a control signal directing the downlink band to the second downlink central frequency;
        tune a RF (radio frequency) unit in order to switch the downlink band from the first downlink central frequency to the second downlink central frequency; and
        receive, from the base station, downlink data on the downlink band according to the second downlink central frequency.

8. The user device of claim 7, wherein the downlink central frequency corresponds to a central frequency of the downlink-dedicated band and wherein the second downlink central frequency corresponds to a central frequency of a band which is generated by combining the downlink-dedicated band with the upward/downward variable band.

9. The user device of claim 7, wherein the first uplink central frequency corresponds to a central frequency of the uplink-dedicated band and wherein the second uplink central frequency corresponds to a central frequency of a band which is generated by combining the uplink-dedicated band with the upward/downward variable band.

* * * * *